J. Knickerbacker,
Clutch Pulley.
Nº 26,369.          Patented Dec. 6, 1859.
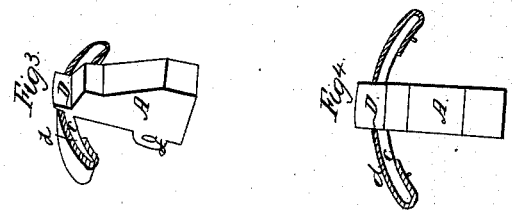
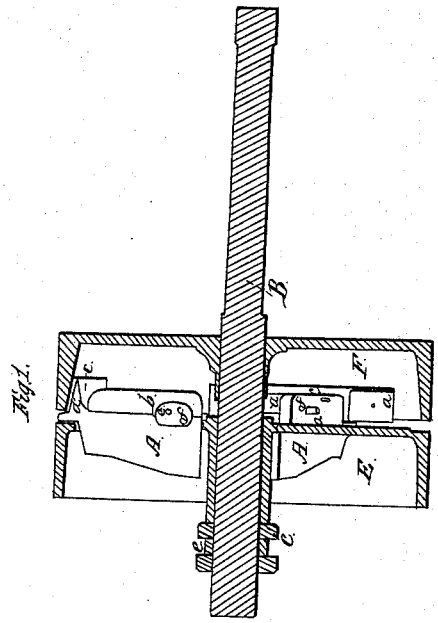
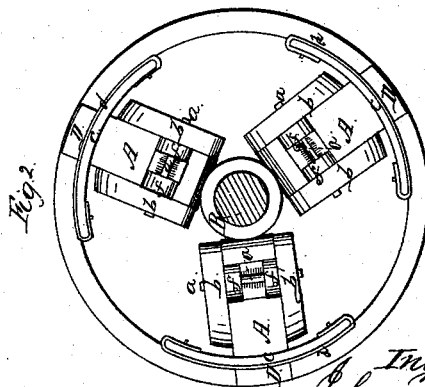
Witnesses
Alex S. Fowler
Thos. H Ganton
Inventor
John Knickerbacker

UNITED STATES PATENT OFFICE.

JOHN KNICKERBACKER, OF STOCKPORT, NEW YORK.

CLUTCH OR PULLEY COUPLING.

Specification of Letters Patent No. 26,369, dated December 6, 1859.

*To all whom it may concern:*

Be it known that I, JOHN KNICKERBACKER, of the town of Stockport, in the county of Columbia and State of New York, have invented a new and Improved Clutch or Coupling Pulley for Actuating Machinery; and I do hereby declare that the following is a full, clear, and exact description of the construction and operation of the same, reference being had to the annexed drawings, making a part of this specification, in which—

Figure 1, is a longitudinal vertical section. Fig. 2, is an interior end view of clutch pulley. Fig. 3 is a perspective of the clutch, detached; and Fig. 4, is a back or outside view of same.

The same letters of reference indicate corresponding parts in all the figures.

Letters A represent the clutches or impellers.

Letter B represents the pulley shaft.

Letter C represents the hub of the clutch pulley.

Letter D represents guards, limiting the vibrations of the clutches.

Letter E represents clutch or loose pulley.

Letter F represents fixed or shaft pulley.

Letter $a$ represents pins on which the clutches vibrate.

Letter $b$ represents flanches or side pieces attached to disk of clutch pulley, through which the hinge pins $a$, pass, and between which the clutches vibrate.

Letter $c$ represents beveled arcs attached to ends of clutch-blocks for clutching the inside of periphery of fixed or shaft pulley.

Letter $d$ represents leather envelops on arcs to insure their adhesion to fixed pulley.

Letter $e$ represents groove in hub of movable pulley for receiving split ring, saddle or other device for operating the same.

Letter $f$, represents hinge flanches on clutches.

This invention is designed to actuate and to stop machinery at pleasure, without jar or concussion: thereby preventing the "wear and tear" consequent upon all abrupt checks of their motions; and consists in providing the disk of movable pulley E with three or more vibratory lever-blocks, suspended in radiating slots or mortises extending from the hub to the rim, through the said disk, and having attached to their extremities friction clutches or impellers in the form of arcs corresponding in curvature with the inner surface of the periphery or band of the fixed pulley F.

To enable those skilled in the art to make and use my invention I will describe its construction and operation.

I cut radial slots, in breadth about equal to one third their length, extending from the hub to the rim through the disk of movable pulley E; each side of these slots is provided, on the inner side of the disk, or that toward the fixed pulley, with supports $b$, $b$, $b$, &c., through which are inserted the hinge pins $a$, $a$, $a$. Into these slots are inserted the lever-blocks, which with their arcs attached I call the clutches or impellers A, A, A. The flanches $f$, $f$, $f$, &c., on each lower margin of the lever-blocks are perforated for the fulcrum pins $a$, $a$, $a$, to pass through, and on these the impellers vibrate so that both their contact with and release of the fixed pulley may be gentle though immediate—yielding yet sufficiently prompt, without wrenching or jarring. The vibratory motions of the clutches, however, are limited by the projections or guards D, which prevent them from falling inward when withdrawn and hold them to their places when moved forward and outward toward the periphery of the fixed pulley F on being pressed up to it; thus causing them to adhere to it firmly and to impel it as required. To the movable pulley E is attached the hub C, revolving freely on shaft B and provided with a groove, $e$, at its outer end in which a split ring, saddle or other equivalent device is to be placed with which to connect and to disconnect the pulleys E and F at pleasure.

The operation of my invention is as follows: The pulley F being attached to the shaft B, and E together with its attachments, being movable thereon, when the latter, while revolving, is pressed forward so that the arcs $c$, $c$, $c$, come in contact with the inside of the periphery or rim of the fixed pulley, the slight bevel of these arcs or of their leather envelops, $d$, $d$, $d$, gradually increasing the radial lengths of the clutches from the hinge pins $a$, $a$, $a$, outward, the clutches themselves vibrating outward as they advance within the fixed pulley, combined with what centrifugal force they may be allowed to exert, after acquiring the requisite velocity, cause the impellers to attach themselves firmly to the inner surface of the rim of pulley F and to force it, together with the shaft B, to revolve with the velocity required. The lateral motion of the loose pulley E and its attachments, is produced as above described. Whenever it is required to stop the machinery which is done by disconnecting the pulleys E and F, the operator by means of the split ring, saddle or other equivalent inserted in the groove, *e*, aided by the simultaneous vibrations inward of the clutches A, withdraws the pulley E relieving the pulley F, and allowing it to stop.

I am aware that friction brakes (so called) actuated by springs, screws, toggles &c. and all attached to a thimble, have been used, sliding radially in mortises or boxes fixed upon the disk of the loose pulley, for the purpose of operating and stopping machinery—this I do not claim—I dispense with the thimble and all of its attachments for operating the pulley F, and employ only my clutches or impellers A, A, A, for that purpose; giving them such form and suspending them in such manner as to cause them to act promptly and efficiently when in contact and yet when desired to stop the machinery, to be easily withdrawn.

The simplicity of the construction and the facility of the operation of these clutches or impellers give them the advantage and entitle them to the preference over all others now in use.

The effect of giving to the heel of the clutch its form and weight is, with the aid of centrifugal force, when disconnected, and in rapid motion (its ordinary motion being rapid) to operate as a counterpoise, causing the guards D, D, D, to swing out from the rim of pulley E and revolve without clattering or noise.

What I claim as my invention and desire to secure by Letters Patent of the United States is—

Suspending the clutches or impellers A, A, A, in radial slots in the disk of the movable pulley E so as to allow them to vibrate, substantially in the manner and for the purpose herein set forth.

JOHN KNICKERBACKER.

Witnesses:
 ISAAC N. COLLIER,
 W. W. MENIFIELD.